US012664113B2

(12) United States Patent
Sugai

(10) Patent No.: US 12,664,113 B2
(45) Date of Patent: Jun. 23, 2026

(54) MULTI-CORE SYSTEM AND READING METHOD

(71) Applicant: Renesas Electronics Corporation, Tokyo (JP)

(72) Inventor: Ryosuke Sugai, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 36 days.

(21) Appl. No.: 18/437,924

(22) Filed: Feb. 9, 2024

(65) Prior Publication Data

US 2024/0311321 A1     Sep. 19, 2024

(30) Foreign Application Priority Data

Mar. 16, 2023     (JP) ................................. 2023-041633

(51) Int. Cl.
G06F 13/28          (2006.01)
(52) U.S. Cl.
CPC .................................... G06F 13/28 (2013.01)
(58) Field of Classification Search
None
See application file for complete search history.

(56) References Cited

U.S. PATENT DOCUMENTS

| | | | | |
|---|---|---|---|---|
| 9,483,411 | B2 * | 11/2016 | Ikeda | .................... G06F 3/0647 |
| 11,099,789 | B2 * | 8/2021 | Maharana | ............... G06F 13/28 |
| 11,159,408 | B2 * | 10/2021 | Svennebring | ......... H04L 41/147 |

| | | | | |
|---|---|---|---|---|
| 11,199,853 | B1 * | 12/2021 | Afrouzi | .................. B25J 13/006 |
| 11,232,023 | B2 * | 1/2022 | Lee | ...................... G06F 12/0882 |
| 11,994,751 | B1 * | 5/2024 | Wagner | .................. G02C 5/146 |
| 2014/0201305 | A1 * | 7/2014 | Dalal | .................. G06F 12/1081 709/212 |
| 2014/0201761 | A1 * | 7/2014 | Dalal | .................. G06F 13/4022 718/108 |
| 2015/0067224 | A1 * | 3/2015 | Arroyo | ............... G06F 12/1081 710/308 |
| 2016/0371034 | A1 * | 12/2016 | Kang | ...................... G06F 13/28 |
| 2019/0265976 | A1 * | 8/2019 | Goryavskiy | ........ G06F 9/30058 |
| 2020/0057728 | A1 * | 2/2020 | Koo | ..................... G06F 12/0875 |
| 2020/0310993 | A1 * | 10/2020 | Kumar | .................. G06F 3/0604 |
| 2020/0394409 | A1 * | 12/2020 | Cristache | ............... G06V 20/20 |
| 2021/0049105 | A1 * | 2/2021 | Lin | .......................... G06F 13/28 |

(Continued)

FOREIGN PATENT DOCUMENTS

JP          2005-301714 A     10/2005

*Primary Examiner* — Henry Tsai
*Assistant Examiner* — Christopher A Bartels
(74) *Attorney, Agent, or Firm* — Rimon P.C.

(57)          ABSTRACT

A multi-core system includes a first processor core, a first memory coupled to the first processor core, a first communication IF including a first DMA unit coupled to the first memory, a second processor core, a second memory coupled to the second processor core, a second communication IF including a second DMA unit coupled to the second memory, and an MMU. In a case where page data of a page designated as a read destination by the first processor core is stored in the second memory, the MMU causes the first DMA unit to set a first transmission descriptor based on a page number of the page. The first communication IF transmits a data request including the page number and destination data to the second communication IF according to the first transmission descriptor.

9 Claims, 9 Drawing Sheets

(56) References Cited

U.S. PATENT DOCUMENTS

| | | | |
|---|---|---|---|
| 2021/0109867 A1* | 4/2021 | Wu | G06F 12/1027 |
| 2021/0248094 A1* | 8/2021 | Norman | G06F 13/1668 |
| 2022/0113991 A1* | 4/2022 | Singh | G06F 11/3438 |
| 2023/0031200 A1* | 2/2023 | Dao | G06F 1/163 |
| 2023/0231811 A1* | 7/2023 | Dalal | G06F 13/1605 |
| | | | 710/308 |
| 2023/0360388 A1* | 11/2023 | Singh | G06V 30/10 |
| 2024/0192690 A1* | 6/2024 | Ebrahimi Afrouzi | |
| | | | B25J 13/087 |
| 2024/0296128 A1* | 9/2024 | Sheng | G06F 13/1626 |
| 2025/0013578 A1* | 1/2025 | Shin | G06F 12/1009 |
| 2025/0047560 A1* | 2/2025 | Friedman | H04L 41/0816 |
| 2025/0053284 A1* | 2/2025 | Mannor | G06F 3/04845 |

* cited by examiner

MULTI-CORE SYSTEM AND READING METHOD

CROSS-REFERENCE TO RELATED APPLICATIONS

The disclosure of Japanese Patent Application No. 2023-041633 filed on Mar. 16, 2023 including the specification, drawings and abstract is incorporated herein by reference in its entirety.

BACKGROUND

The present disclosure relates to a multi-core system and a reading method.

There is disclosed a technique listed below.
[Patent Document 1] Japanese Unexamined Patent Application Publication No. 2005-301714

Patent Document 1 discloses a technique related to a multi-central processing unit (CPU) system that transmits and receives data between CPUs. The multi-CPU system includes two CPUs. Each of the two CPUs allocates a register or RAM of the other CPU to its own memory space. Then, data is transferred by writing data into an area of the register or RAM of the other CPU allocated to its own memory space or by reading data from the area of the register or RAM of the other CPU allocated to its own memory space. As a result, in communication between the CPUs, by accessing the RAM or the register existing in a memory space of the other CPU allocated to its own memory space, a procedure necessary for data transmission and reception between the two CPUs can be simplified.

SUMMARY

In recent years, a multi-core system as disclosed in Patent Document 1 has tended to be more complicated. In this case, it is further desirable to simplify a procedure for data sharing between processor cores included in the multi-core system.

Other problems and novel features will become apparent from the description of the present specification and the accompanying drawings.

According to an embodiment, a multi-core system includes a first processor core, a first memory coupled to the first processor core, a first direct memory access (DMA) unit coupled to the first memory, a second processor core, a second memory coupled to the second processor core, and a memory management unit (MMU) that causes the first DMA unit to set a first transmission descriptor based on a page number in a case where page data of a page designated as a read destination by the first processor core is stored in the second memory.

According to the embodiment, in a case where the page data of the page designated as the read destination by the first processor core coupled to the first memory is stored in the second memory coupled to the second processor core, the first DMA unit coupled to the first memory is caused to set the first transmission descriptor based on the page number.

The embodiment makes it possible to prevent an increase in processing of the first processor core and the second processor core when communication data is transmitted and received between the first processor core and the second processor core.

DETAILED DESCRIPTION

Figure 1:
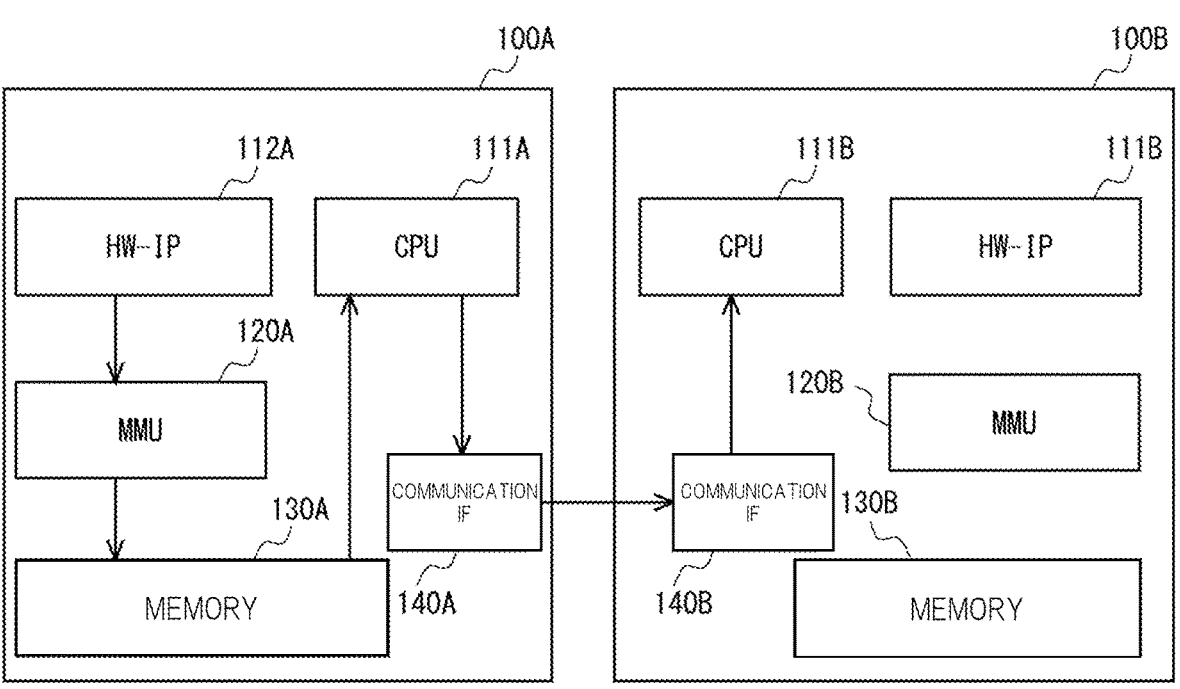
FIG. 1 is a diagram for describing a configuration of a multi-core system according to a study example.

For clarity of description, the following description and drawings are omitted and simplified as appropriate. In addition, each element described in the drawings as a functional block that performs various processing can include a CPU, a memory, and other circuits in terms of hardware, and is achieved by a program loaded in the memory or the like in terms of software. Therefore, it is understood by those skilled in the art that these functional blocks can be achieved in various forms by only hardware, only software, or a combination thereof, and the functional blocks are not limited to any thereof. Note that in the drawings, the same elements are denoted by the same reference signs, and redundant description is omitted, as necessary.

In addition, the above-described program includes a command group (or software code) for causing a computer to perform one or more functions described in an embodiment in a case where the program is read by the computer. The program may be stored in a non-transitory computer-readable medium or a tangible storage medium. By way of example and not limitation, the computer readable medium or the tangible storage medium includes a random access memory (RAM), a read only memory (ROM), a flash memory, a solid state drive (SSD) or another memory technology, a CD-ROM, a digital versatile disc (DVD), a Blu-ray (registered trademark) disk or another optical disk storage, a magnetic cassette, a magnetic tape, a magnetic disk storage, or another magnetic storage device. The program may be transmitted on a transitory computer readable medium or a communication medium. By way of example and not limitation, the transitory computer readable medium or the communication medium include propagated signals in electrical, optical, acoustic, or other forms.
(Circumstances Leading to Embodiments)

First, with reference to FIG. 1, a problem newly found by the inventors will be described. A conventional multi-core system assumes that data is transferred between CPUs. In the case of a multi-core system including a processor core for a specific application, it is conceivable to implement a memory management unit (MMU). The inventors have studied a multi-core system according to the following study example.

FIG. 1 is a diagram for describing a configuration of the multi-core system according to the study example. The multi-core system according to the study example includes a semiconductor device 100A and a semiconductor device 100B. The semiconductor devices 100A and 100B are configured to be able to communicate with each other via a network (not illustrated). A node where the semiconductor device 100A exists is referred to as a node A, and a node where the semiconductor device 100B exists is referred to as a node B.

The semiconductor device 100A includes a CPU 111A, a hardware (HW)-intellectual property (IP) 112A, an MMU 120A, a memory 130A, and a communication interface (IF) 140A. Similarly, the semiconductor device 100B includes a CPU 111B, an HW-IP 112B, an MMU 120B, a memory 130B, and a communication IF 140B.

The CPUs 111A and 111B are general-purpose processor cores. The HW-IPs 112A and 112B are processor cores for a specific application. The HW-IPs 112A and 112B are, for example, dedicated circuits that perform predetermined image processing.

The MMU 120A converts a logical address of a read destination or a write destination that is designated from the HW-IP 112A into a physical address in the memory 130A. The logical address includes a page number. In a case where the designated logical address does not correspond to the physical address in the memory 130A, the MMU 120A notifies the CPU 111A. Similarly, the MMU 120B converts a logical address of a read destination or a write destination that is designated from the HW-IP 112B into a physical address in the memory 130B. In a case where the designated logical address does not correspond to the physical address in the memory 130B, the MMU 120B notifies the CPU 111B.

The memories 130A and 130B are storage areas of dynamic random access memories (DRAMs) or the like. The communication IF 140A and the communication IF 140B are configured to be able to communicate with each other.

Next, a flow of operation when the HW-IP 112A reads data from the memory 130B will be described. First, the HW-IP 112A transmits the logical address of the read destination to the MMU 120A. The MMU 120A notifies the CPU 111A that the designated logical address does not correspond to the physical address in the memory 130A. Next, the CPU 111A transmits communication data for a data request to the node B via the communication IF 140A. Then, the CPU 111B transmits communication data including page data to the node A via the communication IF 140B.

The CPU 111A performs processing of receiving a notification from the MMU 120A and processing of transmitting communication data for a data request to the node B. Therefore, there is a problem that a load on the CPU 111A is large.

The inventors of the present application have conceived embodiments based on the above examination. Hereinafter, the embodiments will be described.

First Embodiment

Figure 2:
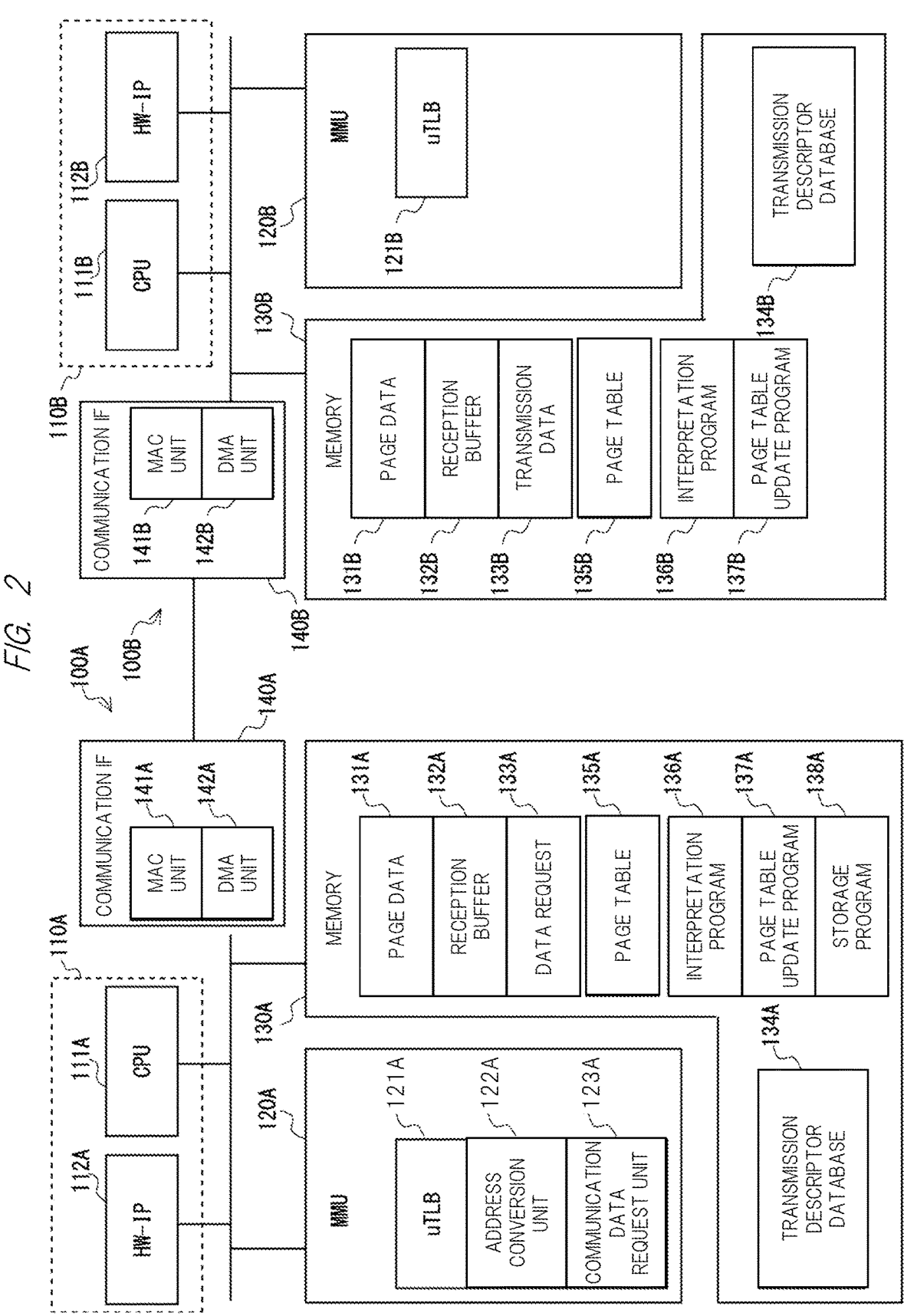
FIG. 2 is a diagram for describing a configuration of a multi-core system according to a first embodiment.

FIG. 2 is a diagram for describing a configuration of a multi-core system according to a first embodiment. The multi-core system according to the first embodiment includes semiconductor devices 100A and 100B. A configuration in a case where the semiconductor device 100A reads data stored in a memory of the semiconductor device 100B is illustrated.

Each of the semiconductor devices 100A and 100B may include a single semiconductor chip or may include a plurality of semiconductor chips. The semiconductor devices 100A and 100B are configured to be able to communicate with each other. A node where the semiconductor device 100A exists is referred to as a node A, and a node where the semiconductor device 100B exists is referred to as a node B.

The semiconductor device 100A includes a processor core 110A, an MMU 120A, a memory 130A, and a communication IF 140A. Similarly, the semiconductor device 100B includes a processor core 110B, an MMU 120B, a memory 130B, and a communication IF 140B.

The processor core 110A, the MMU 120A, the memory 130A, and the communication IF 140A are configured to be able to communicate with each other via a bus. Similarly, the processor core 110B, the MMU 120B, the memory 130B, and the communication IF 140B are configured to be able to communicate with each other via a bus.

The processor core 110A includes a CPU 111A and an HW-IP 112A. Similarly, the processor core 110B includes a CPU 111B and an HW-IP 112B. The CPUs 111A and 111B are general-purpose processor cores. The HW-IPs 112A and 112B are processor cores for a specific application. The HW-IPS 112A and 112B may be hardware for acceleration including hardware such as a graphics processing unit (GPU), a field programmable gate array (FPGA), or a dedicated large scale integration (LSI). The HW-IPs 112A and 112B are, for example, dedicated circuits that perform predetermined image processing. Note that as described later, the processor core 110A may include only one of the CPU 111A and the HW-IP 112B.

The MMU 120A and the MMU 120B include a unified translation lookaside buffer (uTLB) 121A and a uTLB 121B, respectively. The uTLB 121A is a cache memory that temporarily stores the contents of a page table 135A to be described later. The uTLB 121B is a cache memory that temporarily stores the contents of a page table 135B.

In addition, the MMU 120A includes an address conversion unit 122A and a communication data request unit 123A. The address conversion unit 122A converts a logical address designated as a read destination from the HW-IP 112A into the physical address in the memory 130A. The logical address includes a page number. In a case where the designated logical address does not exist on the page table 135A, the address conversion unit 122A notifies the communication data request unit 123A. In a case where the communication data request unit 123A receives a notification from the address conversion unit 122A, the communication data request unit 123A causes a DMA unit 142A to be described later to set a transmission descriptor based on the page number. Note that a specific configuration of the transmission descriptor will be described later.

The memory 130A stores a page data 131A, a reception buffer 132A, a data request 133A, a transmission descriptor database 134A, the page table 135A, an interpretation program 136A, a page table update program 137A, and a storage program 138A.

The page data 131B to be described later is copied to the page data 131A. Data received by the communication IF 140A is stored in the reception buffer 132A. The data request 133A is communication data (example: packet) to be transmitted to the node B. The data request 133A includes destination data and a page number. The destination data represents, for example, an address of the node B. The destination data may be, for example, a destination MAC address included in an Ethernet (registered trademark, the same applies hereinafter) frame.

The transmission descriptor database 134A stores a plurality of transmission descriptors. Each transmission descriptor is a so-called direct memory access (DMA)

descriptor and includes an address that refers to data to be transferred. The plurality of transmission descriptors each corresponds to a plurality of pages stored in the memory 130B. Note that a specific configuration of the transmission descriptor database 134A will be described later.

The page table 135A stores a correspondence relationship between the physical address in the memory 130A and the logical address. Each entry of the page table 135A has a valid/invalid bit. In addition, the page table 135A also includes a bit for setting each page to a non-readable state or a non-writable state. The interpretation program 136A is a program for interpreting transmission data 133B received from the node B. The page table update program 137A is a program for updating the page table 135A. The storage program 138A is a program for storing page data received from the node B in the page data 131A.

Note that a function implemented by the CPU 111A reading and executing the interpretation program 136A may also be referred to as the interpretation program 136A. Similar description applies to the page table update program 137A and the storage program 138A.

The memory 130B includes the page data 131B, a reception buffer 132B, the transmission data 133B, a transmission descriptor database 134B, the page table 135B, an interpretation program 136B, and a page table update program 137B.

Page data is stored in the page data 131B. Data received by the communication IF 140B is stored in the reception buffer 132B. The transmission data 133B represents communication data for page data transmission. The transmission data 133B includes destination data and page data. The destination data represents, for example, an address of the node A.

The transmission descriptor database 134B stores a plurality of transmission descriptors. Each transmission descriptor is a so-called DMA descriptor and includes an address of data to be transferred. The plurality of transmission descriptors each corresponds to a plurality of pages stored in the memory 130B. Not that a specific configuration of the transmission descriptor database 134B will be described later.

The page table 135B stores a correspondence relationship between the physical address in the memory 130B and a logical address. Each entry of the page table 135B has a valid/invalid bit. In addition, the page table 135B also includes a bit for setting each page to a non-readable state or a non-writable state. The interpretation program 136B is a program for interpreting the data request 133A. The interpretation program 136B causes a DMA unit 142B to set a transmission descriptor based on a page number. The page table update program 137B is a program for updating the page table 135B.

A function implemented by the CPU 111A reading and executing the interpretation program 136B may also be referred to as the interpretation program 136B. Similar description applies to the page table update program 137B.

The communication IF 140A includes an MAC unit 141A and the DMA unit 142A. The communication IF 140B includes an MAC unit 141B and the DMA unit 142B. The communication IFs 140A and 140B are configured to be able to communicate with each other. The communication IFs 140A and 140B may perform communication using Ethernet.

The MAC units 141A and 141B perform MAC layer processing. The DMA unit 142A and the DMA unit 142B are coupled to the memory 130A and the memory 130B, respectively.

The DMA unit 142A performs DMA transfer according to a transmission descriptor based on a page number. As a result, the communication IF 140A transmits the data request 133A to the communication IF 140B. Similarly, the DMA unit 142B performs DMA transfer according to a transmission descriptor based on a page number. As a result, the communication IF 140B transmits the transmission data 133B to the communication IF 140A. The DMA units 142A and 142B may transfer, for example, data stored in an address designated by the transmission descriptor to a transmission buffer (not illustrated).

Figure 3:
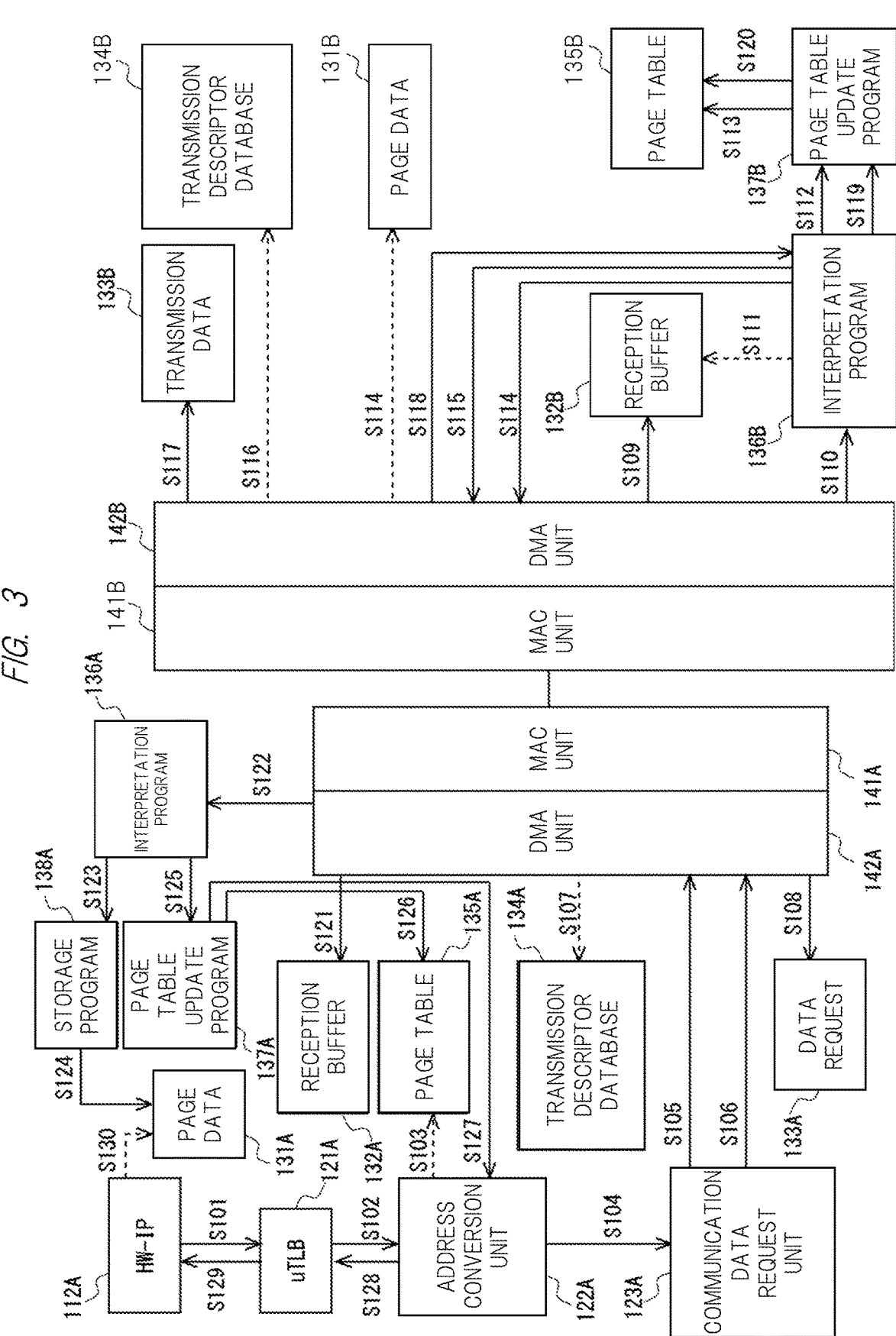
FIG. 3 is a diagram for describing operation of the multi-core system according to the first embodiment.

Next, with reference to FIG. 3, operation of the multi-core system according to the first embodiment will be described. First, the HW-IP 112A requests the uTLB 121A to refer to the logical address (step S101). Next, the uTLB 121A instructs the address conversion unit 122A to convert the logical address into a physical address (step S102).

Next, the address conversion unit 122A refers to the page table 135A (step S103) and detects access to an unregistered logical address. Next, the address conversion unit 122A transmits a signal notifying the detection of the access to the unregistered logical address and a page number included in the logical address to the communication data request unit 123A (step S104). Next, the communication data request unit 123A causes the DMA unit 142A to set the transmission descriptor based on the page number (step S105). Next, the communication data request unit 123A instructs the DMA unit 142A to start DMA transfer (step S106). Next, the DMA unit 142A reads the set transmission descriptor (step S107) and performs DMA transfer. As a result, the data request 133A is prepared (step S108), and the data request 133A is transmitted to the node B.

Next, the DMA unit 142B stores the received data request 133A in the reception buffer 132B (step S109). Next, the DMA unit 142B transmits a reception completion interruption to the interpretation program 136B (step S110).

Next, the interpretation program 136B extracts the page number from the reception buffer 132B (step S111). Next, the interpretation program 136B passes the page number to the page table update program 137B and instructs the page table update program 137B to set the page of the page number to be non-writable (step S112). Next, the page table update program 137B sets the page to be non-writable (step S113). Next, the interpretation program 136B causes the DMA unit 142B to set the transmission descriptor based on the page number (step S114). Next, the interpretation program 136B instructs the DMA unit 142B to start DMA transfer (step S115). Next, the DMA unit 142B reads the set transmission descriptor (step S116) and performs DMA transfer. As a result, the transmission data 133B is prepared (step S117), and the transmission data 133B is transmitted to the node A. Next, the DMA unit 142B transmits a transmission completion interruption to the CPU 111B, and the CPU 111B starts the interpretation program 136B (step S118). Next, the interpretation program 136B passes the page number to the page table update program 137B and instructs the page table update program 137B to set the page of the page number to be writable (step S119). Next, the page table update program 137B sets the page to be writable (step S120).

Next, the DMA unit 142A stores the transmission data 133B in the reception buffer 132A (step S121). Next, the DMA unit 142A transmits a reception completion interruption to interpretation program 136A (step S122). Next, the interpretation program 136A extracts the transmission data 133B from the reception buffer 132A and passes the transmission data 133B to the storage program 138A (step S123).

Next, the storage program 138A stores, in the page data 131A, the page data included in the transmission data 133B (step S124). Next, the interpretation program 136A passes the page number to the page table update program 137A and instructs the page table update program 137A to set the page of the page number to be readable (step S125). Next, the page table update program 137A sets the page to be writable (step S126). Next, the page table update program 137A notifies the address conversion unit 122A that sharing of the page data is completed (step S127). Next, the address conversion unit 122A notifies the uTLB 121A of a physical address of the page data 131A (step S128). Next, the uTLB 121A notifies the HW-IP 112A of the physical address of the page data 131A (step S129). Next, the HW-IP 112A reads the page data 131A (step S130).

Figure 4:
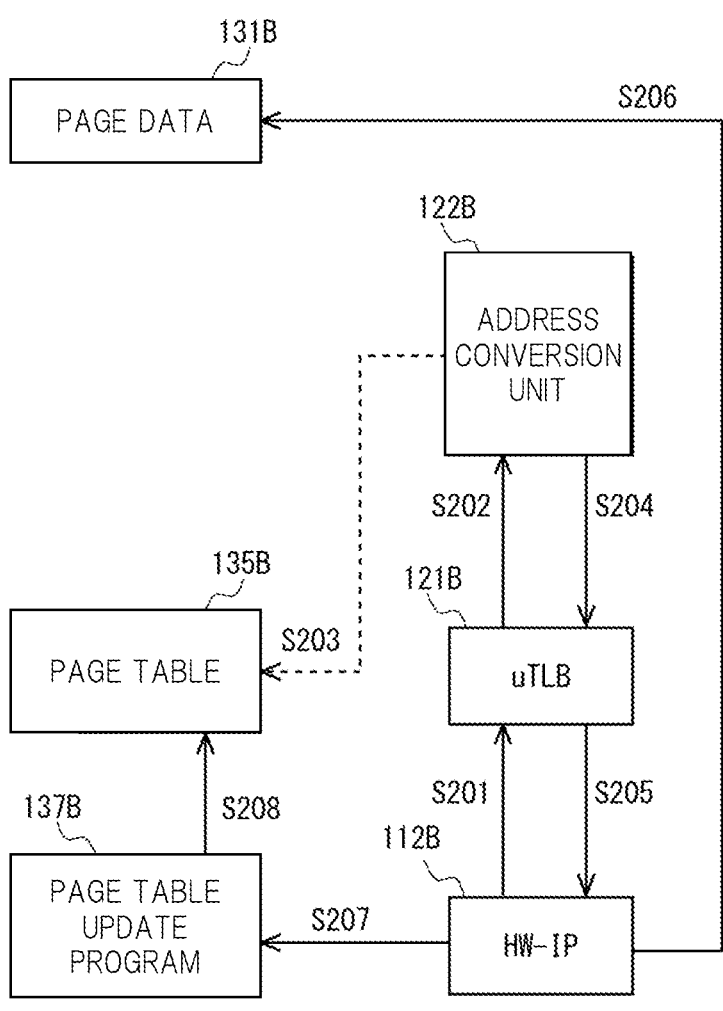
FIG. 4 is a diagram for describing operation of the multi-core system according to the first embodiment.

Next, with reference to FIG. 4, operation when the HW-IP 112B writes page data in the memory 130B will be described. First, the HW-IP 112B requests the uTLB 121B to refer to a logical address (step S201). Next, the uTLB 121B instructs an address conversion unit 122B to convert the logical address into a physical address (step S202). Next, the address conversion unit 122B refers to the page table 135B (step S203) and specifies a corresponding physical address. Next, the address conversion unit 122B transmits the specified physical address to the uTLB 121B (step S204). Next, the uTLB 121B transmits the physical address to the HW-IP 112B (step S205). Next, the HW-IP 112B writes the page data 131B in the physical address (step S206). The HW-IP 112B transmits a completion interruption to the CPU when writing of the page data is completed. The CPU 111B passes the page number to the page table update program 137B and instructs the page table update program 137B to set the page to a valid state (step S207). Next, the page table update program 137B sets the page to a valid state (step S208).

Figure 5:
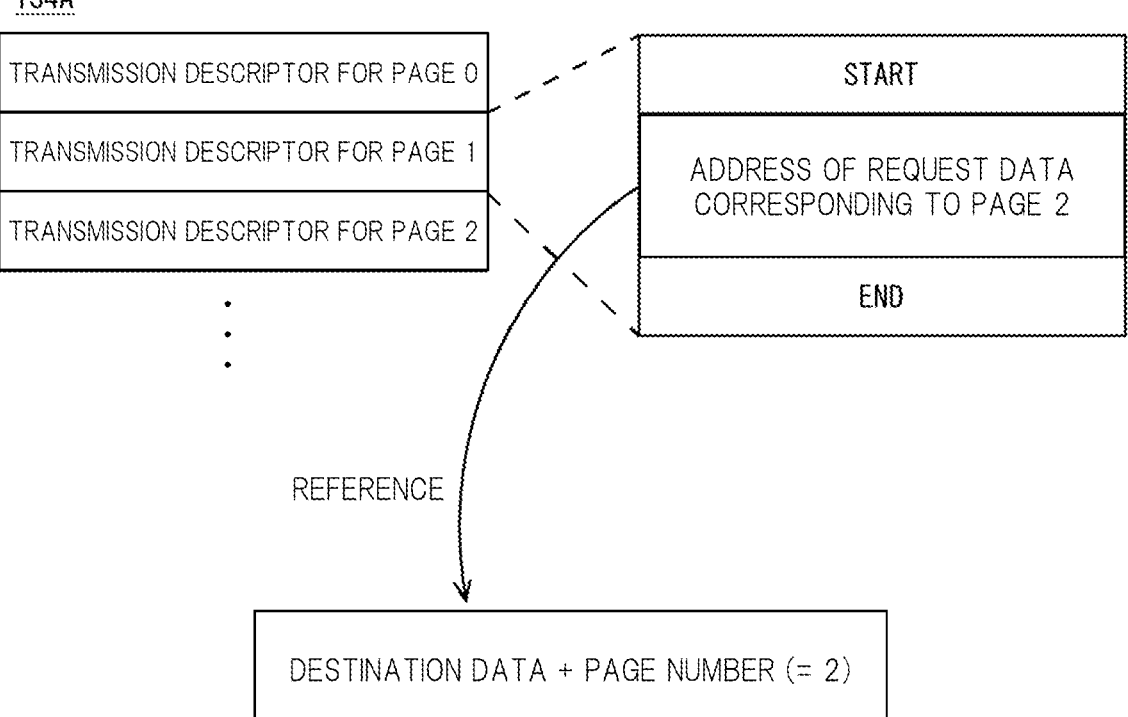
FIG. 5 is a diagram for describing a configuration of a transmission descriptor database according to the first embodiment.

FIG. 5 is a diagram for describing a configuration of the transmission descriptor database 134A. Each of the plurality of transmission descriptors is associated with a page number. The above-described address conversion unit 122A sets the transmission descriptor on the basis of the page number. It is preferable that the plurality of transmission descriptors is arranged in a physically continuous memory area in order in which each of the plurality of transmission descriptors corresponds to a page number and that data sizes of the transmission descriptors are equal to each other. In this case, an address of each transmission descriptor is obtained by multiplying the data size by the number of the transmission descriptor (example: page number) and adding a multiplication result to the address of a first transmission descriptor.

In each transmission descriptor, START, an address, and END are arranged in this order. The address refers to destination data and data including the page number.

An example of a method of generating the transmission descriptor database 134A will be described. For example, the CPU 111A executes a program (examples: middleware and buffer manager) at the time of system initialization, whereby a plurality of transmission descriptors corresponding to each of a plurality of pages is generated. Then, the CPU 111A stores the plurality of transmission descriptors as the transmission descriptor database 134A in the memory 130A.

Figure 6:
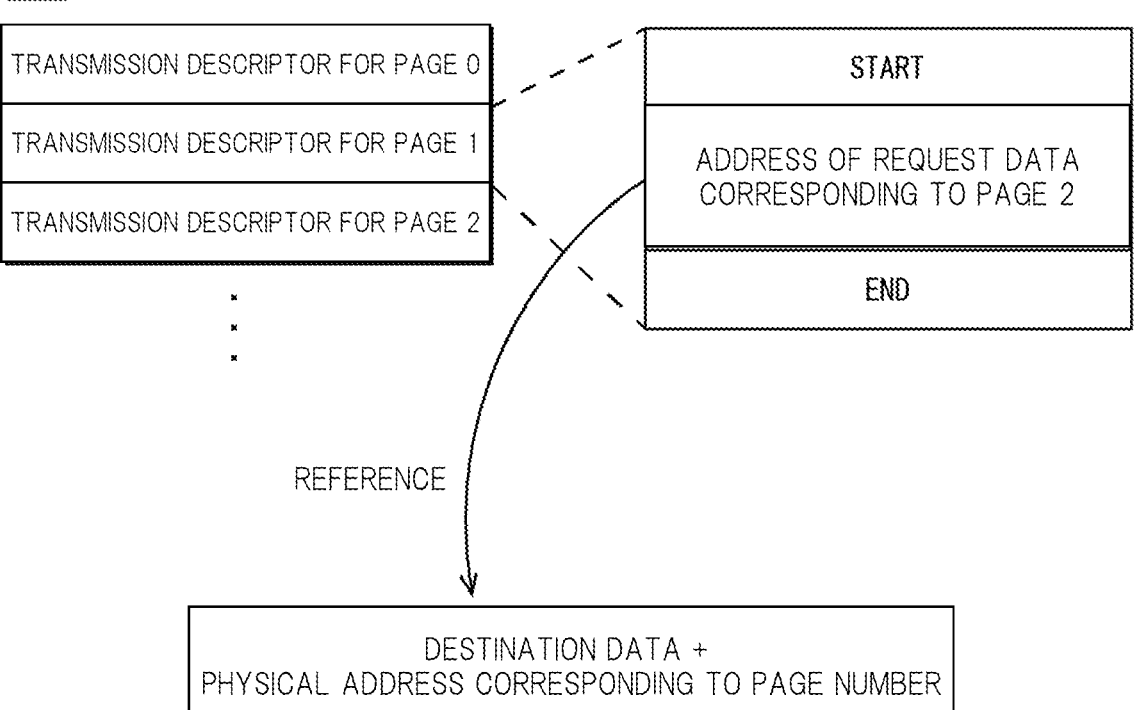
FIG. 6 is a diagram for describing a configuration of the transmission descriptor database according to the first embodiment.

FIG. 6 is a diagram for describing a configuration of the transmission descriptor database 134B. In each transmission descriptor, START, an address, and END are arranged in this order. The address refers to destination data and a physical address indicating a storage destination of the page data.

In the multi-core system according to the first embodiment, the MMU sets the transmission descriptor to the communication IF and conduct DMA-transfer of the data request 133A. As a result, a load on the CPU can be reduced. In addition, since a packet is generated using the DMA descriptor is performed, in the multi-core system according to the first embodiment, a plurality of nodes can communicate with each other by various communication methods (example: Ethernet).

With reference to FIG. 2, the processor core 110A may not include the CPU 111A. This is because in the multi-core system according to the first embodiment, page data can be read without using the CPU 111A. Therefore, a configuration not including each program executed by the CPU 111A can also be included in the first embodiment. In addition, the processor core 110A may include only the CPU 111A. In this case, the MMU 120A receives the logical address from the CPU 111A.

Second Embodiment

The multi-core system according to the first embodiment cannot specify a request destination of page data in a case where the number of nodes is three or more. For example, in a case where a node A reads the page data, the node A cannot determine whether to request the page data from a node B or the page data from a node C.

As a means for solving the present problem, there are a solution 1 and a solution 2. In the solution 1, a request node that requests the page data inquires of all nodes, a node having the page data replies to the request node, and the node that has replied is specified as a request destination. In the solution 2, a node that writes page data (referred to as a producer node) notifies all the nodes, and each node that has received a notification (referred to as a consumer node) stores a notification source node as a request destination.

The present inventors compared the solution 1 and the solution 2 from (1) the viewpoint of latency at the time of read, (2) the viewpoint of frequency of occurrence of messages, and (3) the viewpoint of a cost required to add a function. Regarding (1), the solution 2 in which processing at the time of read is not added is preferable. Regarding (2), it is determined that the solution 2 is preferable in consideration of that the solution 1 requires two messages of an inquiry and a reply at the time of read and the solution 2 requires a single notification at the time of write and the like. Meanwhile, regarding (3), the solution 2 requires that each node manages the producer node. The present inventors arrived at the second embodiment that achieves the solution 2 on the basis of the above study.

Figure 7:
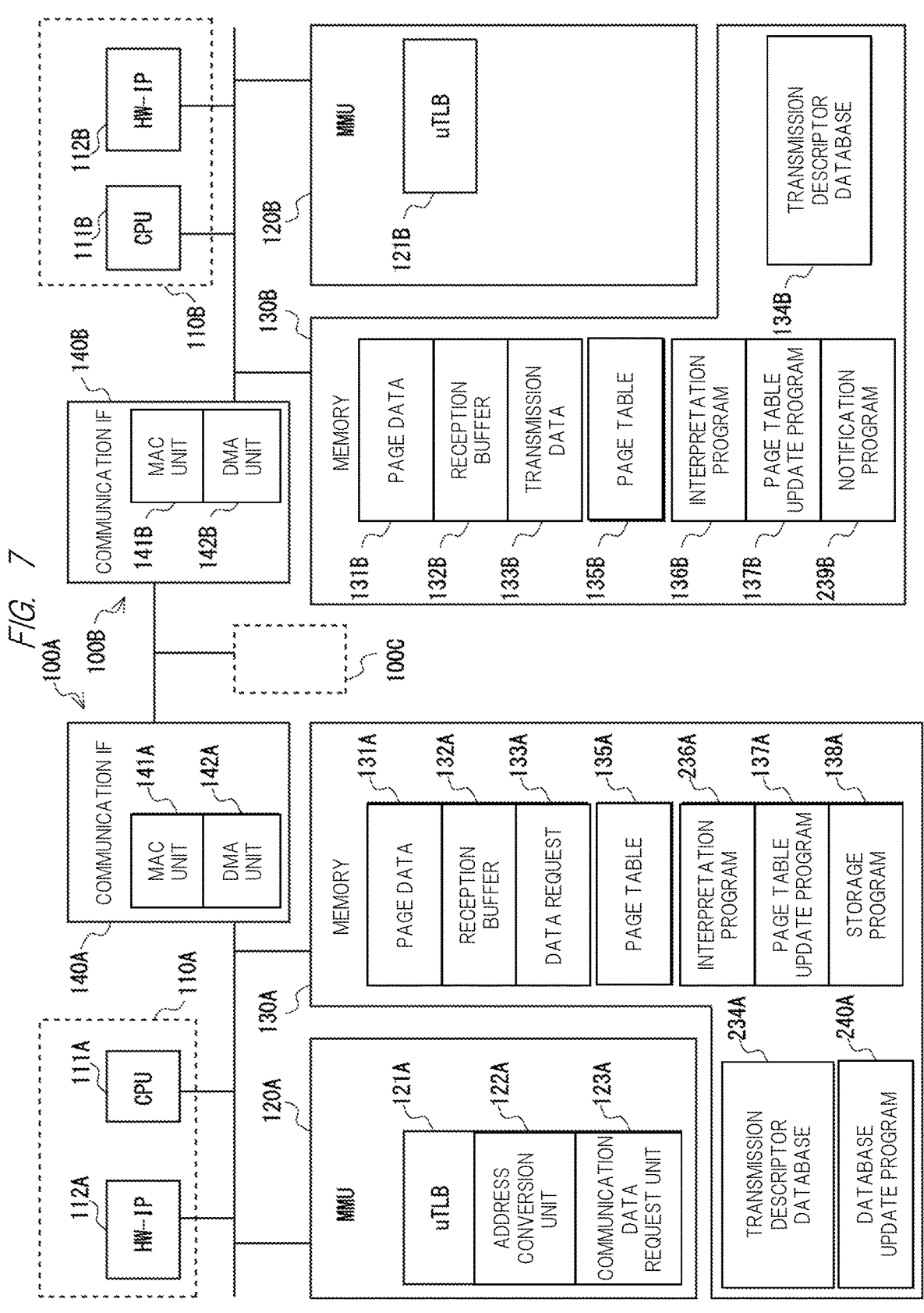
FIG. 7 is a diagram for describing a configuration of a multi-core system according to a second embodiment.

FIG. 7 is a diagram for describing a configuration of a multi-core system according to the second embodiment. Comparing FIG. 2 with FIG. 7, a semiconductor device 100C is added. The semiconductor device 100C has functions similar to functions of the semiconductor devices 100A and 100B. A node where the semiconductor device 100C is present is referred to as a node C.

Referring to a configuration of the semiconductor device 100B, a notification program 239B is added. The notification program 239B is a program for transmitting write notification information including a page number to a node A and the node C when page data is written in a memory 130B. The notification information may include an address of a node B.

Referring to a configuration of the semiconductor device 100A, the transmission descriptor database 134A is replaced with a transmission descriptor database 234A, the interpretation program 136A is replaced with an interpretation program 236A, and a database update program 240A is added. An address of a transmission descriptor included in the transmission descriptor database 234A refers to destination data corresponding to the producer node. The interpretation program 236A further includes a function of interpreting contents of the write notification information. The database update program 240A has a function of updating the transmission descriptor database 234A on the basis of the write notification information.

Figure 8:
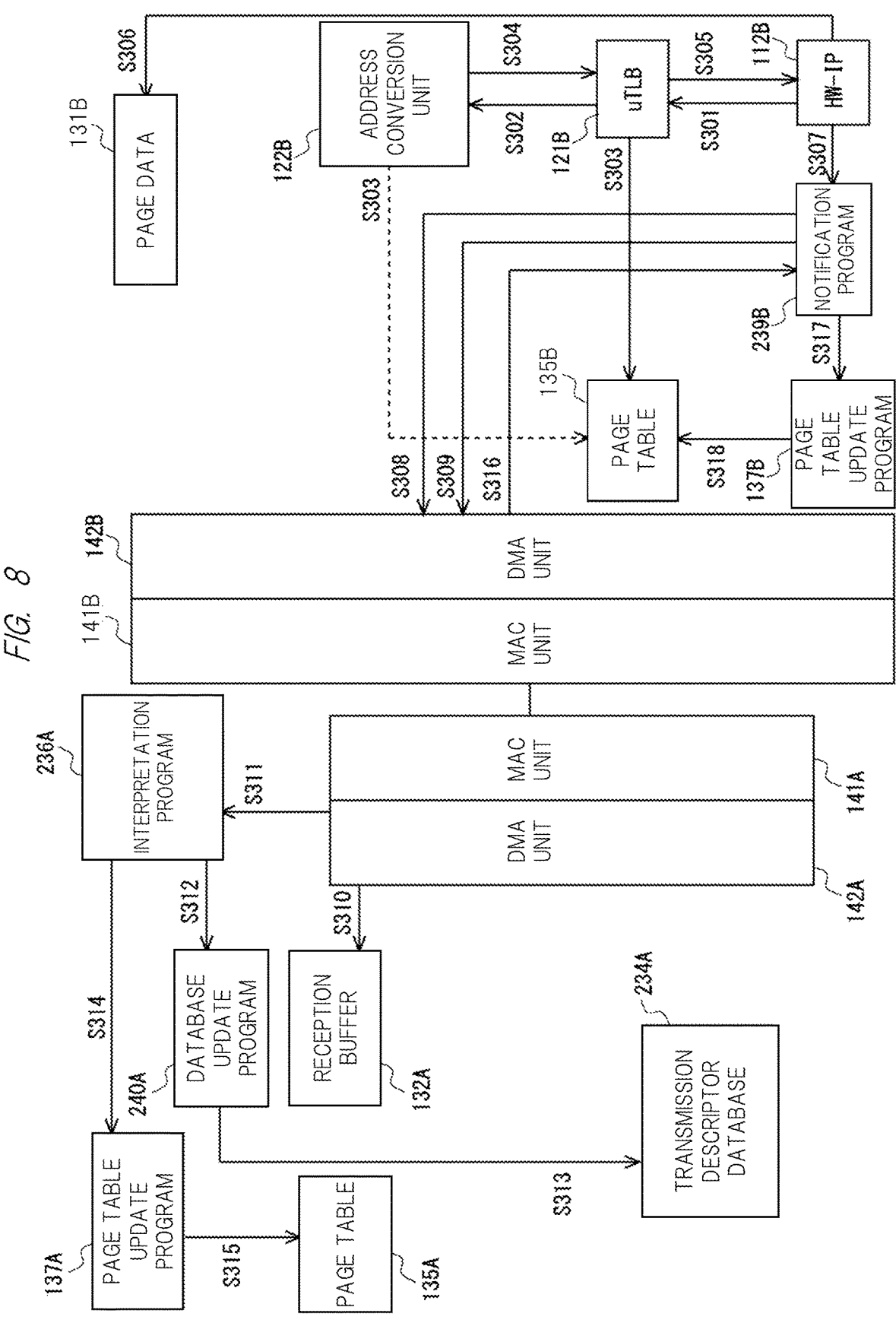
FIG. 8 is a diagram for describing operation of the multi-core system according to the second embodiment.

FIG. 8 is a diagram for describing operation when an HW-IP 112B writes page data. The node C is not illustrated because the node C operates similarly to the node A.

First, the HW-IP 112B requests a uTLB 121B to refer to a logical address (step S301). Next, the uTLB 121B instructs an address conversion unit 122B to convert the logical address into a physical address (step S302). Next, the address conversion unit 122B refers to a page table 135A (step S303) and specifies a physical address corresponding to the logical address. Next, the address conversion unit 122B transmits the specified physical address to the uTLB 121B (step S304). Next, the uTLB 121B transmits the physical address to the HW-IP 112B (step S305). Next, the HW-IP 112B designates the physical address and writes the page data 131B (step S306). The HW-IP 112B completes writing of the page data 131B and transmits an interruption to the notification program 239B (step S307).

Next, the notification program 239B transmits notification information to a DMA unit 142B (step S308). Next, the notification program 239B instructs the DMA unit 142B to start transmission of the notification information (step S309). As a result, the notification information is transmitted to the nodes A and C.

Next, a DMA unit 142A stores the notification information in a reception buffer 132A (step S310). Next, the DMA unit 142A transmits a reception completion interruption to the interpretation program 236A (step S311). Next, the interpretation program 236A reads the notification information from the reception buffer 132A and passes the page number and a notification source address included in the notification information to the database update program 240A (step S312). Next, the database update program 240A updates the transmission descriptor database 234A (step S313).

Next, the interpretation program 236A passes the page number to a page table update program 137A and instructs the page table update program 137A to set the page to an invalid state (step S314). Next, the page table update program 137A sets the page to an invalid state (step S315).

Note that by setting the page to the invalid state, the multi-core system transitions to a state in which the page data of the page can be requested. In a case where the page is not set to the invalid state, old page data continues to be used.

Next, the DMA unit 142B transmits a transmission completion interruption to the notification program 239B (step S316). Next, the notification program 239B passes the page number to the page table update program 137B and instructs the page table update program 137B to set the page to an invalid state (step S317). Next, the page table update program 137B sets the page to a valid state (step S318).

Figure 9:
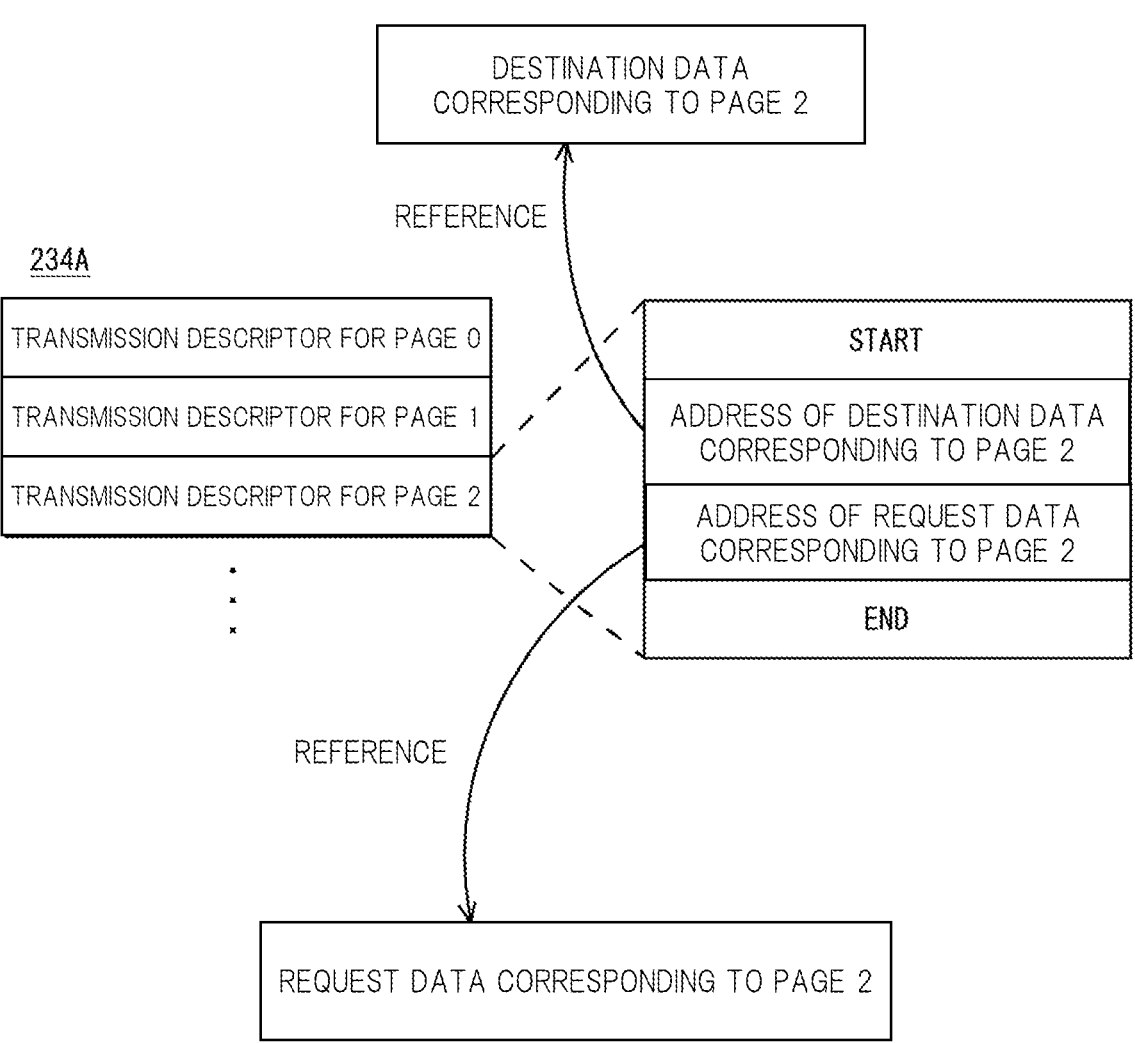
FIG. 9 is a diagram for describing a configuration of a transmission descriptor database according to the second embodiment.

FIG. 9 is a diagram for describing a configuration of the transmission descriptor database 234A. A transmission descriptor includes a first portion that refers to destination data and a second portion that refers to request data, that is, a page number. For example, in a case where a node that has written the page data of a second page is the node A, an address of the node A is set in a portion that refers to the destination data.

In a case where the multi-core system according to the second embodiment includes three or more nodes, the multi-core system can request an appropriate node to transmit page data.

The invention made by the present inventors have been specifically described on the basis of the embodiments. However, the present invention is not limited to the above embodiments, and it goes without saying that various modifications are possible without departing from the gist of the present invention.

What is claimed is:

1. A multi-core system comprising:
a first processor core configured to output a logical address that is a read destination;
a first memory coupled to the first processor core and configured to store a plurality of first transmission descriptors;
a first communication interface including a first direct memory access (DMA) unit coupled to the first memory;
a second processor core;
a second memory coupled to the second processor core;
a second communication interface including a second DMA unit coupled to the second memory; and
a memory management unit (MMU) including an address conversion unit configured to convert the logical address into a physical address and a communication data request unit configured to instruct the first DMA unit to start a DMA transfer,
wherein each of the plurality of first transmission descriptors is arranged in the first memory corresponding to each of a plurality of pages stored in the second memory,
wherein the address conversion unit is configured to transmit a page number included in the logical address to the communication data request unit, when the logical address does not correspond to a physical address in the first memory,
wherein the communication data request unit is configured to cause the first DMA unit to set a first transmission descriptor that corresponds to the page number transmitted from the address conversion unit, among the plurality of first transmission descriptors arranged in the first memory,
wherein the first communication interface is configured to transmit a data request including the page number and destination data to the second communication interface according to the first transmission descriptor set by the first DMA unit,
wherein each of the plurality of first transmission descriptors includes a first portion that refers to the destination data and a second portion that refers to request data stored in the first memory, the request data including the page number,
wherein the data request is generated based on the request data referred to by the second portion and the destination data referred to by the first portion,
wherein the second processor core is configured to transmit notification information to the first processor core when page data of a page corresponding to the page number is written in the second memory, the notification information including the page number and a notification source address identifying the second communication interface, and wherein the first processor core is configured to update, in response to reception of the notification information, the first portion of the first transmission descriptor corresponding to the page number such that the destination data referred to by the first portion indicates the notification source address.

2. The multi-core system according to claim 1, wherein the first processor core includes a processor core for a specific application.

3. The multi-core system according to claim 1,
wherein the second memory is configured to store a plurality of second transmission descriptors,
wherein each of the plurality of second transmission descriptors is arranged in the second memory corresponding to each of the plurality of pages stored in the second memory,
wherein the second DMA unit is configured to read a second transmission descriptor that corresponds to the data request received by the second communication interface, among the plurality of second transmission descriptors arranged in the second memory, and
wherein the second communication interface is configured to transmit transmission data including destination data and the page data to the first communication interface according to the second transmission descriptor read by the second DMA unit.

4. The multi-core system according to claim 3, wherein the second processor core is configured to execute a program to:
extract the page number included in the data request received by the second communication interface; and
cause the second DMA unit to set the second transmission descriptor that corresponds to an extracted page number, among the plurality of second transmission descriptors arranged in the second memory.

5. The multi-core system according to claim 4,
wherein the second memory is configured to store the page data, and
wherein the second transmission descriptor set by the second DMA unit includes an address that refers to the destination data and the page data included in the transmission data.

6. The multi-core system according to claim 1,
wherein the first processor core includes a general-purpose processor core, and
wherein the general-purpose processor core is configured to execute a program to generate the plurality of first transmission descriptors corresponding to each of a plurality of pages stored in the second memory, the general-purpose processor core being configured to store the plurality of first transmission descriptors as a transmission descriptor database in the first memory.

7. A reading method comprising:
outputting, using a first processor core, a logical address that is a read destination;
storing, in a first memory coupled to the first processor core, a plurality of first transmission descriptors such that each of the plurality of first transmission descriptors is arranged in the first memory corresponding to each of a plurality of pages stored in a second memory coupled to a second processor core, the second processor core being different from the first processor core;
converting, using an address conversion unit in a memory management unit (MMU), the logical address into a physical address;
instructing, by a communication data request unit in the MMU, a first direct memory access (DMA) unit coupled to the first memory to start a DMA transfer;
transmitting, using the address conversion unit, a page number included in the logical address to the communication data request unit when the logical address does not correspond to a physical address in the first memory;
causing, the communication data request unit, the first DMA unit to set a first transmission descriptor that corresponds to the page number transmitted from the address conversion unit, among the plurality of first transmission descriptors arranged in the first memory; and
transmitting, by a first communication interface including the first DMA unit, a data request including the page number and destination data to a second communication interface including a second DMA unit coupled to the second memory according to the first transmission descriptor set by the first DMA unit,
wherein each of the plurality of first transmission descriptors includes a first portion that refers to the destination data and a second portion that refers to request data stored in the first memory, the request data including the page number,
wherein the data request is generated based on the request data referred to by the second portion and the destination data referred to by the first portion,
wherein the reading method further comprises:
transmitting, by the second processor core, notification information to the first processor core when page data of a page corresponding to the page number is written in the second memory, the notification information including the page number and a notification source address identifying the second communication interface; and
updating, by the first processor core, in response to reception of the notification information, the first portion of the first transmission descriptor corresponding to the page number such that the destination data referred to by the first portion indicates the notification source address.

8. The multi-core system according to claim 1,
wherein each of the plurality of first transmission descriptors is arranged in a continuous area in the first memory in an order corresponding to a page number, and
wherein data sizes of the plurality of first transmission descriptors are equal to each other.

9. The multi-core system according to claim 1,
wherein the first memory is configured to store the data request, and
wherein the first transmission descriptor set by the first DMA unit includes an address that refers to the destination data and the page number included in the data request.

* * * * *